(12) United States Patent
Motherwell

(10) Patent No.: US 8,876,174 B2
(45) Date of Patent: Nov. 4, 2014

(54) MOTORCYCLE PARAPHERNALIA LOCKING SYSTEM

(76) Inventor: Kelly Motherwell, Langley (CA)

(*) Notice: Subject to any disclaimer, the term of this patent is extended or adjusted under 35 U.S.C. 154(b) by 282 days.

(21) Appl. No.: 13/282,276

(22) Filed: Oct. 26, 2011

(65) Prior Publication Data

US 2012/0272697 A1 Nov. 1, 2012

Related U.S. Application Data

(60) Provisional application No. 61/407,311, filed on Oct. 27, 2010, provisional application No. 61/476,685, filed on Apr. 18, 2011.

(51) Int. Cl.
*E05C 3/02* (2006.01)
*E05C 3/24* (2006.01)
*B62J 7/04* (2006.01)
*B62K 19/40* (2006.01)
*B62J 11/00* (2006.01)
*B62J 1/28* (2006.01)

(52) U.S. Cl.
CPC ... *B62J 1/28* (2013.01); *E05C 3/24* (2013.01); *B62J 7/04* (2013.01); *B62K 19/40* (2013.01); *B62J 11/00* (2013.01); *Y10S 292/37* (2013.01); *Y10S 292/53* (2013.01)

USPC .... 292/194; 292/195; 292/203; 292/DIG. 37; 292/DIG. 53

(58) Field of Classification Search
CPC ....... E05B 1/0038; E05B 17/04; E05B 63/20; E05B 2017/20
USPC ......... 292/57, 63, 64, 95, 109, 121, 194, 195, 292/203, 207, 219, 333, DIG. 37, DIG. 53, 292/DIG. 61
See application file for complete search history.

(56) References Cited

U.S. PATENT DOCUMENTS

| | | | |
|---|---|---|---|
| 5,664,715 A | 9/1997 | Gogan et al. | |
| 6,729,515 B2 * | 5/2004 | Nicosia et al. | 224/413 |
| 6,736,438 B1 * | 5/2004 | Wieclawski | 296/24.3 |
| 6,827,376 B2 * | 12/2004 | Fountaine | 292/98 |
| 7,032,973 B2 * | 4/2006 | Reubeuze | 297/378.13 |
| 7,175,220 B2 | 2/2007 | Kashiwagi et al. | |
| 8,051,688 B2 * | 11/2011 | Soma | 70/162 |

* cited by examiner

*Primary Examiner* — Kristina Fulton
*Assistant Examiner* — Christine M Mills
(74) *Attorney, Agent, or Firm* — Dwayne E. Rogge; Schacht Law Office, Inc.

(57) ABSTRACT

This disclosure relates to a novel concept regarding the specific latching mechanism to provide a secure and easily releasable device. The latching mechanism is used to attach an accessory such as a luggage rack or the sissy bar to a motorcycle or equivalent.

14 Claims, 15 Drawing Sheets

MOTORCYCLE PARAPHERNALIA LOCKING SYSTEM

RELATED APPLICATIONS

This application claims priority benefit of U.S. Ser. No. 61/407,311, filed Oct. 27, 2010 and U.S. Ser. No. 61/476,685 filed Apr. 18, 2011.

BACKGROUND OF THE DISCLOSURE

Field of the Disclosure

This disclosure relates to the field of locking mechanisms for motorcycles used to interconnect a motorcycle accessory to a motorcycle frame, sub-frame, or body panel.

SUMMARY OF THE DISCLOSURE

Disclosed herein is a latching mechanism for a motorcycle accessory in one form comprising a housing substantially enclosing inner moving components. The inner moving components comprising in turn: a linearly sliding release pin extending through the housing, the release pin having an inner portion within the housing, and an outer portion exterior of the housing; a release pin biasing spring biasing the release pin toward a latched position; a latching arm having interconnected to the release pin so as to reposition as the release pin is actuated and released; the latching arm having a latching arm seer surface; a jaw arm having a transverse pivot axis relative to the housing, the jaw arm interoperating with the latching arm seer surface through a jaw arm seer surface. The jaw arm comprising a jaw arm grasping surface; a jaw arm biasing spring biasing the jaw arm toward a released position; wherein the latching mechanism is configured to release the jaw arm from a latched position, toward a released position as the latching arm rotates until the latching arm seer surface no longer is in contact with the jaw arm seer surface. The housing further comprising a mounting structure operatively configured to interconnect the latching mechanism to the motorcycle accessory. The housing further comprising a housing grasping surface adjacent the jaw arm grasping surface when the jaw arm is in the latched position. The latching mechanism may be arranged wherein the latching arm is rotatably coupled to the housing. The latching mechanism in another embodiment is arranged wherein the latching arm is coupled to the housing and linearly repositions relative thereto.

The latching mechanism described above may comprise a keyed locking mechanism configured to selectively permit repositioning of the latching arm. In one form, the latching mechanism is arranged wherein the locking mechanism rotates about an axis of rotation which is substantially at a right angle to the linear direction of travel of the release pin. To increase the ease of use of the locking mechanism, the latching mechanism may be arranged wherein the locking mechanism rotates about an axis of rotation which is offset from a right angle to the linear direction of travel of the release pin. In one form, the latching mechanism further comprises a linear actuator which repositions along the axis of rotation of the locking mechanism when the locking mechanism has released, and wherein the linear actuator contacts a portion of the latching arm and prohibits movement thereof.

A system for connecting an accessory to a motorcycle or equivalent is disclosed. This system using a plurality of mirror image latching mechanisms for a motorcycle accessory, each latching mechanism comprising a housing substantially enclosing inner moving components. The inner moving components comprising: a linearly sliding release pin extending through the housing, the release pin having an inner portion within the housing, and an outer portion exterior of the housing; a release pin biasing spring biasing the release pin toward a latched position; a latching arm having interconnected to the release pin so as to reposition as the release pin is actuated and released. The latching arm includes a latching arm seer surface. A jaw arm having a transverse pivot axis relative to the housing, the jaw arm interoperating with the latching arm seer surface through a jaw arm seer surface; the jaw arm comprising a jaw arm grasping surface; a jaw arm biasing spring biasing the jaw arm toward a released position; wherein the latching mechanism is configured to release the jaw arm from a latched position, toward a released position as the latching arm rotates until the latching arm seer surface no longer is in contact with the jaw arm seer surface. The housing further comprising a mounting structure operatively configured to interconnect the latching mechanism to the motorcycle accessory. The housing further comprising a housing grasping surface adjacent the jaw arm grasping surface when the jaw arm is in the latched position.

As above, the latching mechanism may be arranged wherein the latching arm is rotatably coupled to the housing. In another embodiment, the latching arm is coupled to the housing and linearly repositions relative thereto. The latching mechanism may further comprise a keyed locking mechanism configured to selectively permit repositioning of the latching arm. The latching mechanism may be arranged wherein the locking mechanism rotates about an axis of rotation which is substantially at a right angle to the linear direction of travel of the release pin. In one form, the latching mechanism is configures such that the locking mechanism rotates about an axis of rotation which is offset from a right angle to the linear direction of travel of the release pin.

As above, one embodiment is arranged wherein the locking mechanism further comprises a linear actuator which repositions along the axis of rotation of the locking mechanism when the locking mechanism has released, and wherein the linear actuator contacts a portion of the latching arm and prohibits movement thereof.

DESCRIPTION OF THE PREFERRED EMBODIMENTS

This disclosure relates to a novel concept regarding the specific latching mechanism to provide a secure and easily releasable device. The latching mechanism is used to attach an accessory such as the luggage rack 84 of FIG. 7A or the sissy bar 80 to a motorcycle 78 or equivalent. While releasable latching mechanisms PA20 have been utilized for some time in this field, such as the mechanisms described in U.S. Pat. Nos. 6,729,515 and 5,664,715, incorporated herein by reference, the improvements provided herein are significant and novel in light of the prior art. The improvements add increased functionality, as well as protection to the internal moving components, protection of the user from the moving components, and in at least one embodiment, a locking mechanism for additional safety and security.

While the prior art latching mechanisms 82 functioned, they are aesthetically unappealing, and generally suffered from exposure to the elements, and exposed operators, and adjacent hardware such as straps, clothing, etc to damage especially as the accessory is being attached to the motorcycle 78. In addition, as the release mechanism is substantially exposed, it is prone to catching on the users clothing, or other hardware which may result in an undesired release of the accessory. By enclosing most of the moving components, this danger is reduced, and the aesthetic appeal is improved.

Figure 1:
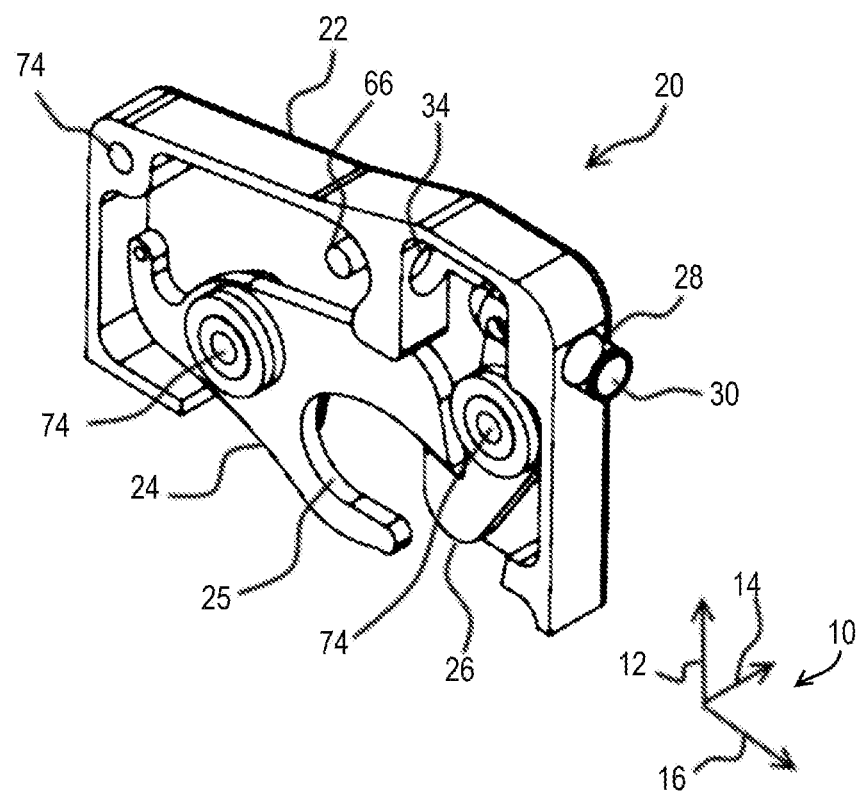
FIG. 1 is an isometric view of one embodiment of the disclosure.

Looking to FIG. 1, an isometric view of a first embodiment of the latching mechanism 20 can quite easily be seen, including a jaw arm 24 and interoperating latching arm 26. The jaw arm 24 having a jaw grasping surface 25. A pushbutton release pin 28 can also be easily seen in this view, including the pressure surface 30. Each of these parts will be described in more detail herein.

Before continuing with a detailed description, an axes system 10 is shown comprising a vertical axis 12, a transverse axis 14, and a longitudinal axis 16. These axes are used to define relative positions and directions of movement, and are not intended to limit the scope of the claims, except where specifically referenced in the claims.

Figure 2:
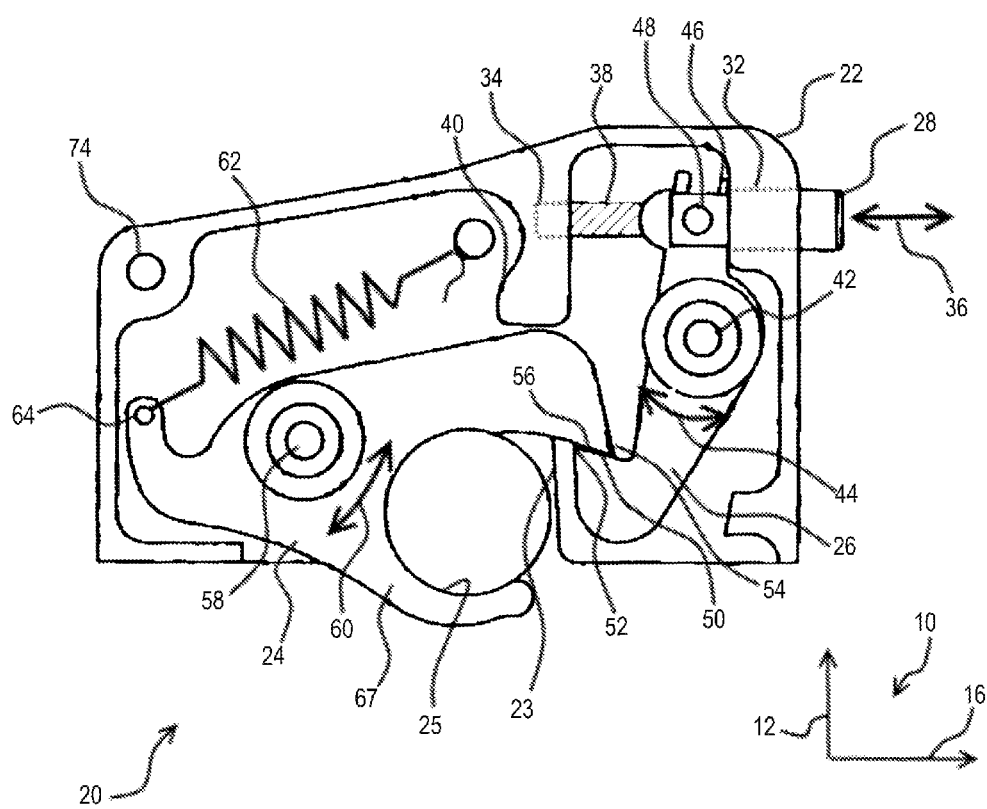
FIG. 2 is a side view of the embodiment of FIG. 1.
Figure 3:
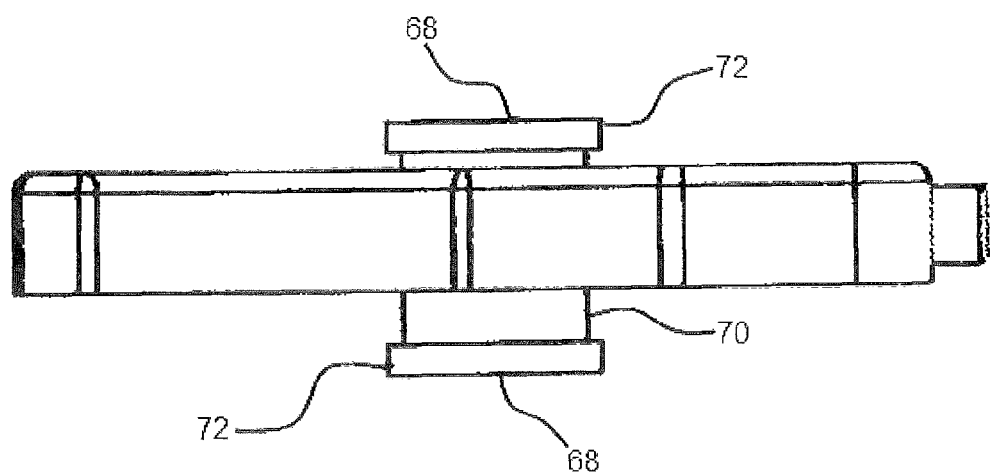
FIG. 3 is a top view of the embodiment of FIG. 1.
Figure 4:
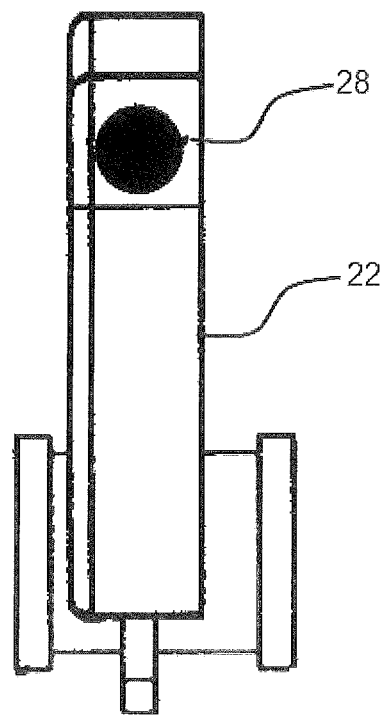
FIG. 4 is an end view of the embodiment of FIG. 1.

It is expected that the operation and benefits of this latching mechanism 20 will be easily understood by one of ordinary skill in the art once the interoperating parts are described. Looking to FIG. 2, the release pin 28 can be seen in profile. The release pin 28 is operably configured to longitudinally slide within void 32 of the housing 22 in a direction of reciprocating travel indicated at 36. A biasing member such as for example the compression spring 38 recesses partly within the void 34 and biases the release pin 28 outward, away from the extension 40 toward a latched position where the seer surface of the latching arm retains the jaw arm in a latched position as will be described below. In one form, the latching arm 26 comprises a channel 46 which fits around a portion of the release pin 28. A securing pin 48 may be used to further couple the release pin 28 to the latching arm 26 while still allowing linear motion of the release pin 28 to transfer to rotational movement of the latching arm 26. Thus, as the release pin 28 repositions along direction of travel 36, a corresponding rotary motion will be experienced by the latching arm 26 about the pivot 42 in the direction shown at 44. The latching arm 26 also comprises a seer surface 50 terminating in a seer point 52.

The jaw arm 24 comprises a first end, terminating in the seer point 54, at the longitudinally outward end of the seer surface 56. The seer surface 56 engages the seer surface 50 of the latching arm when the latching mechanism 20 is in the latched position, and slides there against as the latching arm 26 rotates. As the seer point 52 of the latching arm 26 passes the seer point 54 of the jaw arm during rotation of the jaw arm 24 about a pivot 58 in direction of travel 60, the jaw arm 24 is released and is biased open either by eternal forces, or by a biasing member. In one form, the biasing member comprises a tension spring 62 which is attached at a first end 64 to a portion of the jaw arm, and attached at a second end 66 to the housing. The tension spring 62 or other biasing member biases the jaw arm 24 to a released position as depicted by direction of travel arrow 60a in FIG. 5 toward a released position as depicted in FIG. 6. Thus, as the release pin 28 is engaged inward, the latching arm 26 rotates and the seer surfaces 50 and 56 slide against each other until the seer point 52 on the latching arm 26 passes the seer point 54 on the jaw arm 24. At this point, the jaw arm 24 rotates to the released position (FIG. 6) by way of force exerted by the spring 62 or other forces in other embodiments.

As shown, the jaw arm 24 includes a second end 67 having a jaw grasping surface 25 configured to cooperate with a housing contact surface 23 of the housing 22 to engage and retain a grommet 68 or equivalent structure attached to the motorcycle. The grommet itself is not significantly novel, as it is shown in the Figures of U.S. Pat. No. 5,664,715 including FIG. 6 where a particular arrangement and attachment method are disclosed. The grommet 68, as shown, comprises a cylindrical center portion 70 and at least one flange 72. In one form, the latching mechanism 20 is attached to the backrest, luggage rack, or other removable portion such as by screwing or bolting through voids 74, while the grommet 68 is mounted to the motorcycle or other structure. Of course, this arrangement can be reversed, as the latching mechanism 20 operates in all orientations as long as the user has access to press the release pin 28 and space is allowed for rotation of the jaw arm 24.

Figure 5:
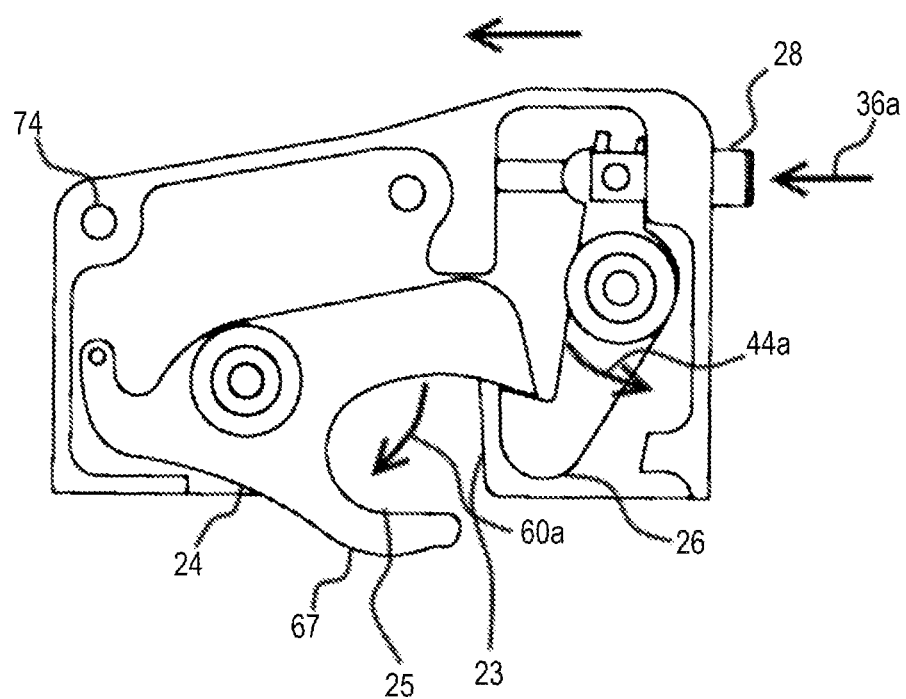
FIG. 5 is a side view of the embodiment of FIG. 1 showing relative movement of the moving parts.
Figure 6:
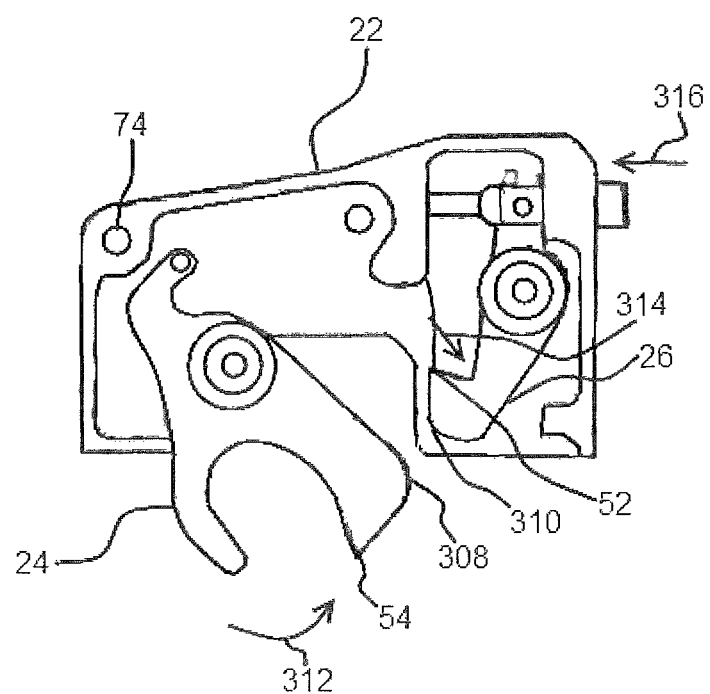
FIG. 6 is a side view of the embodiment of FIG. 1 in an opened orientation.

Looking to FIG. 5, it can be seen how when the release pin 28 is repositioned in direction of travel 36a, the latching arm 26 repositions in direction of travel 44a, and the jaw arm 24 repositions in direction of travel 60a. Thus, the jaw arm 24 is repositioned from the latched position, shown in FIG. 5, to the released position, shown in FIG. 6, whereupon the backrest, luggage rack, etc. is released at this position. Other latching positions may also be utilized, engaging release mechanisms or other apparatus to provide additional connection positions. In one form, the latching mechanisms 20 will be utilized in mirror image pairs, such as at the left and right sides of the accessory. Of course, the latching mechanisms could be operated in other arrangements, such as one latching mechanism per accessory, or sets of three, four, or more. For the most common accessories, it is expected that two latching mechanisms would be used, and additional latching points could be utilized, such as the forward mounting location 76 shown in FIG. 7 or a similar mechanism.

Figure 8:
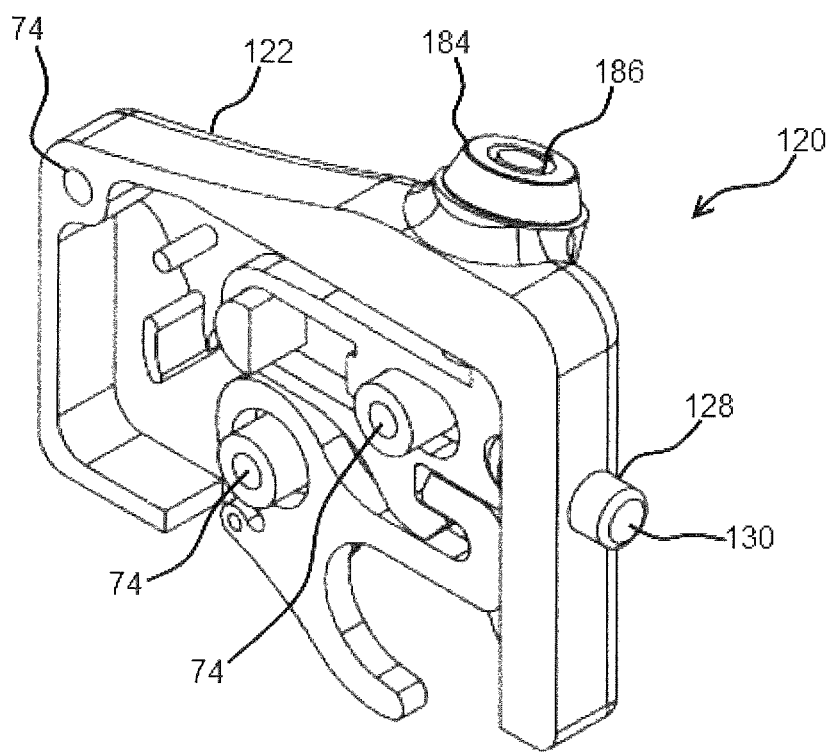
FIG. 8 is an isometric view of a second embodiment of the disclosure.
Figure 9:
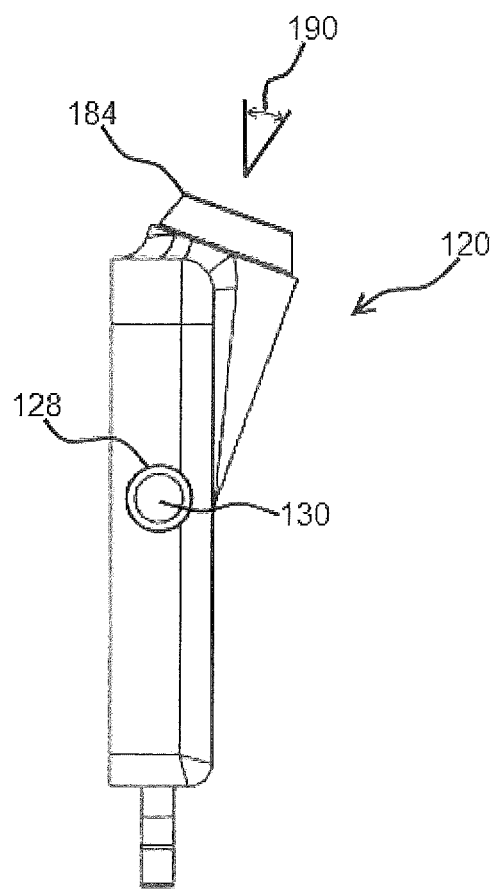
FIG. 9 is an end view of the embodiment of FIG. 8.
Figure 10:
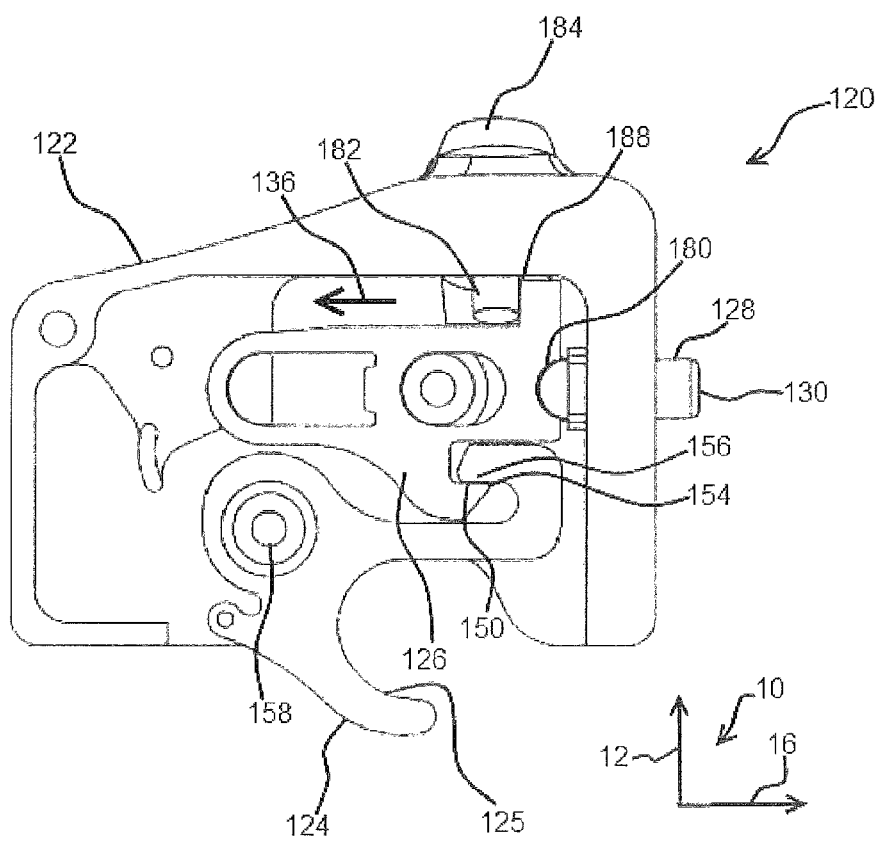
FIG. 10 is a side view of the embodiment of FIG. 8.

Looking to FIGS. 8-10, a second embodiment is shown, which operates on a very similar principle but without the latching arm 126 being rotatably attached. Instead, the equivalent structure is linearly repositioned when the user engages the release pin 128. Elements of this embodiment, which perform the same or similar function to the previous embodiment, are numbered with a 1 prefix. For example, the housing is numbered 22 in the first embodiment shown in FIG. 1, whereas in FIG. 8, the housing is numbered 122. Generally speaking, the additional components of the second embodiment begin with the number 180.

Looking to FIG. 10, the housing 122 is shown whereupon the release pin 128 comprises a pressure surface 130 as described above. Inside the housing, the release pin 128 is attached to the latching arm 126 at a connection point 180. In this way, the latching arm 126 repositions longitudinally inward along direction of travel 136 when the release pin 128 is engaged (repositioned), provided that the lock cam 182 allows such motion.

In one embodiment, the cam 182 is an offset (non-cylindrical) surface that pivots about the axis of a locking mechanism 184 in a way well known to one of ordinary skill in the art. While a barrel-type key surface 186 is shown, other key types could be utilized. As the locking mechanism 184 rotates, a gap is provided at the contact location 188, allowing repositioning of the latching arm 126 along direction of travel 136.

As the latching arm 126 is repositioned, the seer surface 150 of the latching arm 126 slides along the matching seer surface 156 of the jaw arm 124 until the seer point 154 is passed, whereupon the jaw arm 124 rotates about pivot point 158 to release the mechanism as described above.

Figure 11:
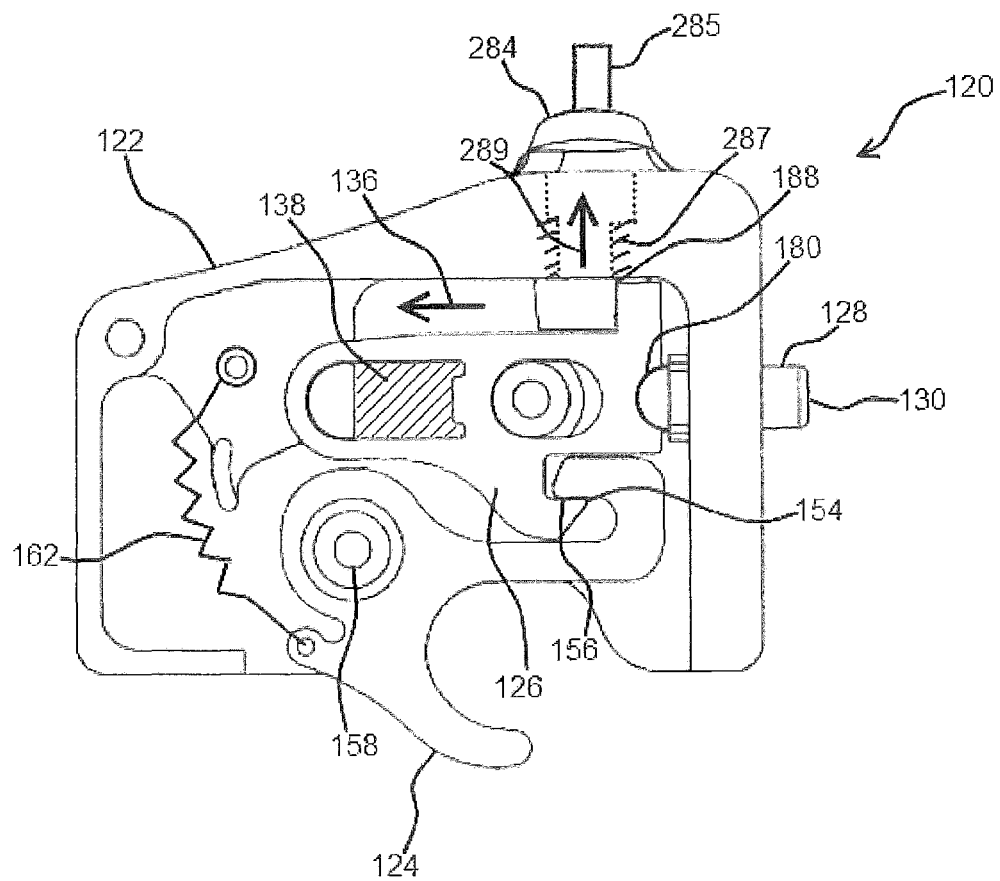
FIG. 11 is a side hidden line view of a third embodiment of the disclosure.

For clarity, the compression spring 138 shown in FIG. 11 biases the latching arm 126 in the latched position. The tension spring 162 is functionally equivalent to the tension spring 62 shown in the previous embodiment.

Figure 7A:
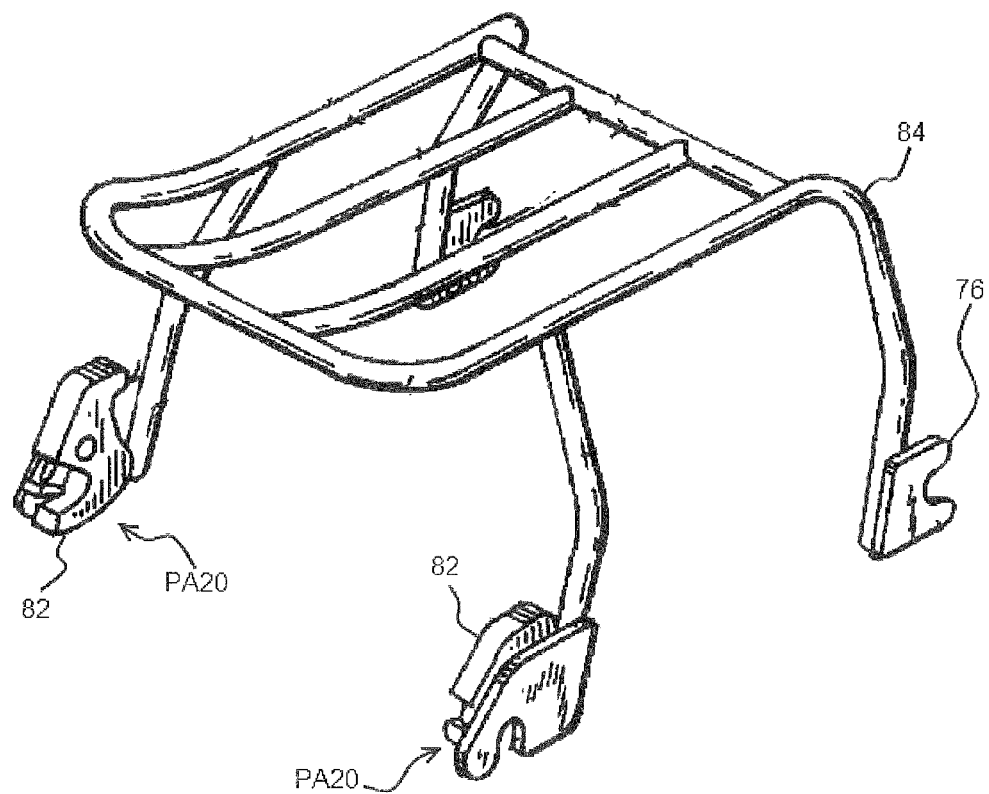
FIG. 7A is an isometric view of a prior art luggage rack and attachment system.
Figure 7B:
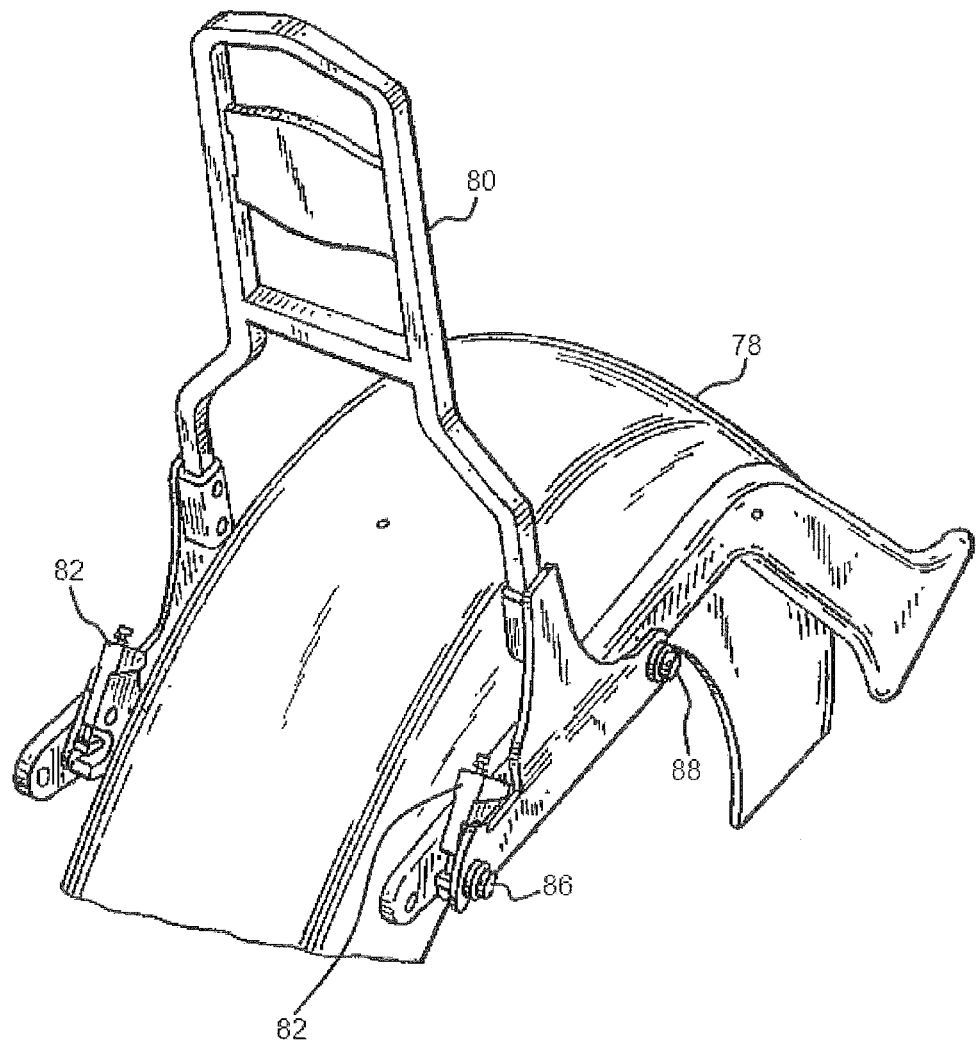
FIG. 7B is an isometric view of a prior art sissy bar and attachment system.

As can be seen in FIG. 9, the locking mechanism 184 may be offset at an offset angle 190 to facilitate use of key as the frame or similar structure of the motorcycle may otherwise interfere. In this embodiment, there may be very little clearance between the surface of the housing 122 of the latching mechanism 120, and the element to be attached thereto, as shown in FIG. 7A. The offset angle 190 allows for rotation of the key without impacting the adjacent surface of the frame, fender, body panel, or other structure.

In another embodiment shown in FIG. 11, the locking mechanism 284 is configured with a linear locking actuator 285 and a compression spring 287 rather than the cam 182 as shown in FIG. 10. When the locking mechanism 284 is rotated using the key, the locking mechanism 284 releases the linear actuator 285 which repositions linearly outward 289 so that it no longer interferes with movement of the latching arm 126.

Figure 12:
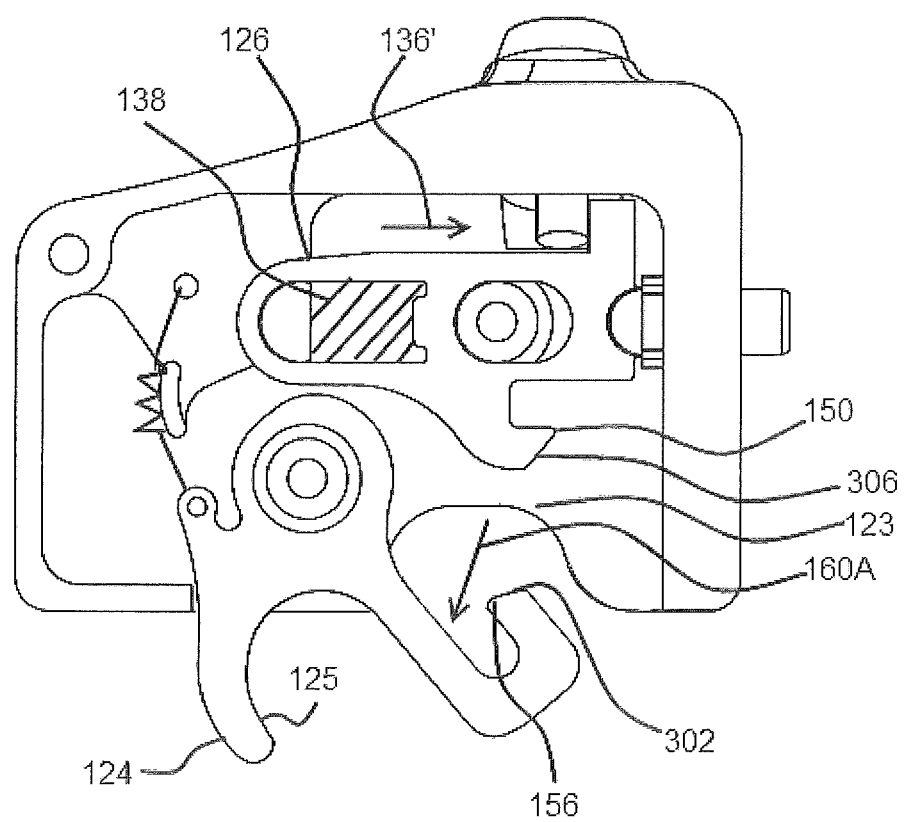
FIG. 12 is a side view of the embodiment of FIG. 8 in an opened orientation.
Figure 13:
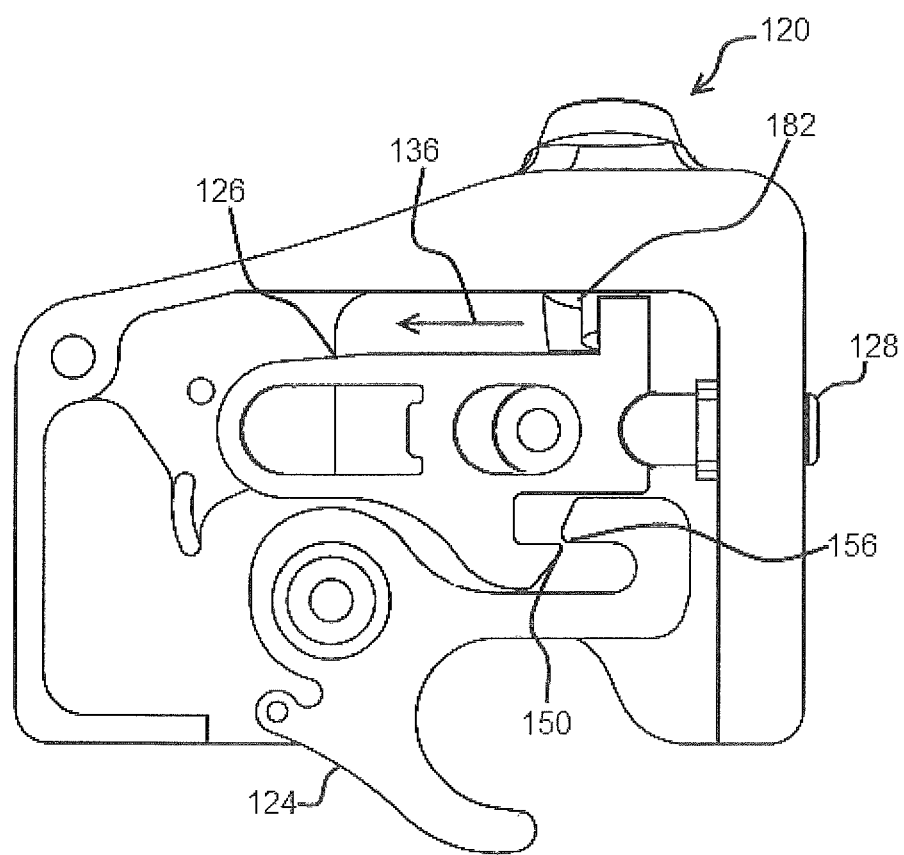
FIG. 13 is a side view of the embodiment of FIG. 8 at the last moment of closure.

FIG. 13 shows the latching mechanism 120 where the latching arm seer point 156 has moved linearly until it is just barely in contact with the jaw arm seer point 150. In this figure, the jaw arm 124 is maintained in the latched position. Looking to FIG. 12, the latching arm has released the jaw arm 124, and the biasing member has returned the latching arm 126 and release pin 128 in direction of travel 136'. The jaw arm 124 has rotated in direction of travel 160A to release the accessory from the grommet or equivalent structure such that the accessory can be removed.

To install the accessory onto the motorcycle, the latching mechanism is released to the positions shown in FIGS. 6 and 12. If the accessory arrangement of FIG. 7A is used, the front mount locations 76 are attached to grommets or other portions of the cycle frame. Looking at the same time to the embodiment of FIG. 12, the opposite end of the accessory is rotated about these grommets until another set of grommets engage the jaw grasping surface 125 of the jaw arm 124. Additional force is applied to overcome the tension of the biasing member or tension spring 62 until a contact surface 320 of the jaw arm contacts a mating contact surface 306 of the tension arm. Further force is applied not only to overcome the tension of the biasing member, but also to force the latching arm 126 in a direction opposite the direction of travel 136' until the seer points 150/154 pass each other, at which time the compression spring 138 repositions the latching arm into the latched position and the jaw arm is prohibited from rotating and releasing the accessory. The locking mechanism 184 may then be employed, keeping the latching arm from repositioning until released. The grommet is then held by the jaw grasping surface 125 in conjunction with the housing contact surface 123.

The embodiment shown in FIG. 6 operates in the same manner. When the jaw arm 24 rotates in direction of travel 312, the contact surface 308 engages the contact surface 310 of the latching arm 26 forcing it in direction of travel 314. Further rotation forces the latching arm in direction of travel 314, and the release pin in direction of travel 316, until the seer points 52/54 pass each other, and the tension spring 38 biases the latching arm in a direction opposite direction of travel 314, and the release pin in a direction opposite direction of travel 316.

These actions latch the accessory onto the cycle without manual repositioning of the latching mechanisms.

Figure 14:
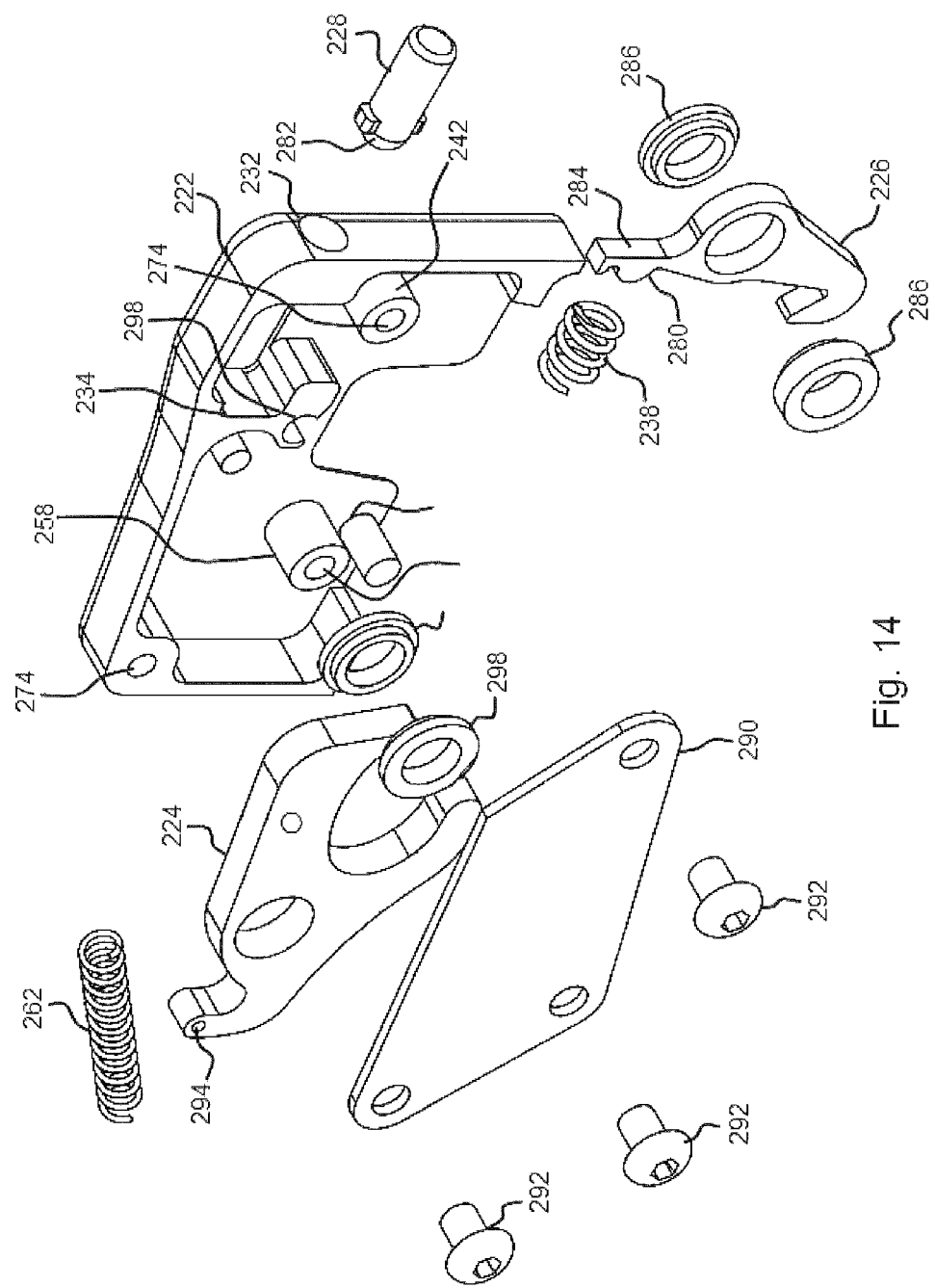
FIG. 14 is an exploded view of an embodiment similar to the first embodiment.

Looking to FIG. 14, a third embodiment is shown, which operates on a very similar principle to the first embodiment but wherein there are a few differences including that the compression spring 238 rests within a recess 234 of the housing 222 and engages a detent 280 on the latching arm 226. Elements of this embodiment, which perform the same or similar function to the first embodiment, are numbered with a 2 prefix. For example, the housing is numbered 22 in the first embodiment shown in FIG. 1, whereas in FIG. 14, the housing is numbered 222. Generally speaking, the additional components of the second embodiment begin with the number 280.

In addition to the change noted above, the pin 48 and channel 46 are replaced by structure where the inner most surface 282 of the release pin 228 engages a contact surface 284 of the latching arm 226.

Washers 286 may be provided in this or the previous embodiments to correctly position the latching arm 226 relative to the pivot 242 that the latching arm rotates about. These washers may function to correctly position the latching arm, as well as to reduce friction, and may be comprised of a vibration dampening material to reduce noise and damage due to vibration of the latching arm 226 relative to the housing 222.

Washers 288 may be provided in this or the previous embodiments to correctly position the jaw arm 224 relative to the pivot 258 that the jaw arm rotates about. These washers may function to correctly position the jaw arm, as well as to reduce friction, and may be comprised of a vibration dampening material to reduce noise and damage due to vibration of the jaw arm 224 relative to the housing 222.

In addition, a temporary cover plate 290 may be provided in this and the previous embodiments. The cover plate 290 may be held in place by fasteners 292 or other methods to secure the moving components in place within the housing 222. In one form the fasteners 292 engage the voids 274 and hold the cover plate in position during transportation sales etc, but may be discarded upon assembly of the apparatus to the motorcycle or accessory, as the surface of the motorcycle or accessory will hold the moving components in position.

On method of assembling this embodiment is to insert the release pin 228 into the void 232 of the housing 222. The washers 286 may then be placed on either side of the latching arm 226, the compression spring 238 attached to the detent 280 of the latching arm 226 and the assembly positioned onto the pivot 242. The tension spring 262 is then attached to the hole 294 on the jaw arm 224 and the washers 288 also attached to the jaw arm 224. The jaw arm assembly may then be positioned upon the pivot 258. The malleable insert 296 may then be positioned within, or adhered within the pocket 298. The apparatus may then be tested for proper operation prior to attaching the cover plate 290.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art.

The invention in its broader aspects is therefore not limited to the specific details, representative apparatus and methods, and illustrative examples shown and described. Accordingly, departures may be made from such details without departing from the spirit or scope of applicants' general concept.

I claim:

1. A latching mechanism for a motorcycle accessory to be removably attached to a motorcycle; the latching mechanism comprising:
   a. a housing substantially enclosing inner moving components on at least four sides;
   b. wherein a fifth side of the housing is in contact with the motorcycle accessory;
   c. the inner moving components comprising:
      i. a linearly sliding release pin extending in a longitudinal axis through a surface defining a void in one side of the housing,
      ii. wherein the release pin is in sliding contact with the surface defining the void in one side of the housing so as to be guiding thereby;
      iii. the release pin having an inner portion within the housing, and an outer portion exterior of the housing;
      iv. a release pin biasing spring biasing the release pin toward an extended position;
      v. a latching arm releasably contacting the release pin so as to reposition as the release pin is actuated and released;
      vi. the latching arm having a latching arm seer surface;
      vii. a jaw arm having a transverse pivot axis orthogonal to the longitudinal axis and vertically offset from the latching arm, the jaw arm capable of contacting the latching arm seer surface through a jaw arm seer surface;
      viii. the jaw arm comprising a jaw arm grasping surface in contact with a protrusion of the motorcycle in a latched position;
      ix. a jaw arm biasing spring biasing the jaw arm toward a released position;
      x. wherein the latching mechanism is configured to release the jaw arm from a latched position, toward a released position as the latching arm repositions until the latching arm seer surface no longer is in contact with the jaw arm seer surface;
   d. the housing further comprising a mounting structure operatively configured to interconnect the latching mechanism to the motorcycle accessory; and
   e. the housing further comprising a housing grasping surface adjacent the jaw arm grasping surface, the housing grasping surface in direct contact with the protrusion of the motorcycle when the jaw arm is in the latched position.

2. The latching mechanism as recited in claim 1 wherein the latching arm is rotateably coupled to the housing.

3. The latching mechanism as recited in claim 1 wherein the latching arm is coupled to the housing and linearly repositions relative thereto.

4. The latching mechanism as recited in claim 3 further comprising a keyed locking mechanism configured to selectively permit repositioning of the latching arm.

5. The latching mechanism as recited in claim 4 wherein the locking mechanism rotates about an axis of rotation which is substantially at a right angle to the linear direction of travel of the release pin.

6. The latching mechanism as recited in claim 4 wherein the locking mechanism rotates about an axis of rotation which is offset from a right angle to the linear direction of travel of the release pin.

7. The latching mechanism as recited in claim 4 wherein the locking mechanism further comprises a linear actuator which repositions along the axis of rotation of the locking mechanism when the locking mechanism has released, and wherein the linear actuator contacts a portion of the latching arm and prohibits movement thereof.

8. A plurality of mirror image latching mechanisms for a motorcycle accessory to be removably attached to a motorcycle; each latching mechanism comprising:
   a. a housing substantially enclosing inner moving components on a least four sides;
   b. wherein a fifth side of the housing is in contact with the motorcycle accessory;
   c. the inner moving components comprising:
      i. a linearly sliding release pin extending in a longitudinal axis through a surface defining a void in one side of the housing, the release pin having an inner portion within the housing, and an outer portion exterior of the housing;
      ii. wherein the release pin is in sliding contact with the surface defining the void in one side of the housing so as to be guided thereby;
      iii. a release pin biasing spring biasing the release pin toward an extended position;
      iv. a latching arm releasably contacting the release pin so as to reposition as the release pin is actuated and released;
      v. the latching arm having a latching arm seer surface;
      vi. a jaw arm having a transverse pivot axis orthogonal to the longitudinal axis and vertically offset from the latching arm, the jaw arm capable of contacting the latching arm seer surface through a jaw arm seer surface;
      vii. the jaw arm comprising a jaw arm grasping surface in contact with a protrusion of the motorcycle in a latched position;
      viii. a jaw arm biasing spring biasing the jaw arm toward a released position;
      ix. wherein the latching mechanism is configured to release the jaw arm from a latched position, toward a released position as the latching arm repositions until the latching arm seer surface no longer is in contact with the jaw arm seer surface;
   d. the housing further comprising a mounting structure operatively configured to interconnect the latching mechanism to the motorcycle accessory; and
   e. the housing further comprising a housing grasping surface adjacent the jaw arm grasping surface, the housing grasping surface in direct contact with the protrusion of the motorcycle when the jaw arm is in the latched position.

9. The latching mechanism as recited in claim 8 wherein the latching arm is rotateably coupled to the housing.

10. The latching mechanism as recited in claim 8 wherein the latching arm is coupled to the housing and linearly repositions relative thereto.

11. The latching mechanism as recited in claim 10 further comprising a keyed locking mechanism configured to selectively permit repositioning of the latching arm.

12. The latching mechanism as recited in claim 11 wherein the locking mechanism rotates about an axis of rotation which is substantially at a right angle to the linear direction of travel of the release pin.

13. The latching mechanism as recited in claim 11 wherein the locking mechanism rotates about an axis of rotation which is offset from a right angle to the linear direction of travel of the release pin.

14. The latching mechanism as recited in claim 11 wherein the locking mechanism further comprises a linear actuator which repositions along the axis of rotation of the locking mechanism when the locking mechanism has released, and wherein the linear actuator contacts a portion of the latching arm and prohibits movement thereof.

\* \* \* \* \*